United States Patent [19]

Kazami et al.

[11] 4,362,373
[45] Dec. 7, 1982

[54] SHUTTER CONTROL DEVICE FOR A CAMERA HAVING A SHUTTER RELEASE LOCK DEVICE

[75] Inventors: Kazuyuki Kazami, Tokyo; Yoshiaki Ohtsubo, Kawasaki, both of Japan

[73] Assignee: Nippon Kogaku K.K., Tokyo, Japan

[21] Appl. No.: 252,995

[22] Filed: Apr. 10, 1981

[30] Foreign Application Priority Data

Apr. 30, 1980 [JP] Japan ................................. 55-56159

[51] Int. Cl.³ .......................... G03B 9/08; G03B 7/00
[52] U.S. Cl. .............................. 354/234; 354/60 R; 354/242; 354/267; 354/289
[58] Field of Search ................... 354/60 R, 60 L, 234, 354/242, 267, 289

[56] References Cited

U.S. PATENT DOCUMENTS

| | | | |
|---|---|---|---|
| 3,829,877 | 8/1974 | Kitai | 354/242 |
| 4,096,503 | 6/1978 | Sato | 354/234 |
| 4,143,958 | 3/1979 | Ishiguro et al. | 354/267 |
| 4,161,764 | 7/1979 | Ishiguro et al. | 354/234 |
| 4,190,337 | 2/1980 | Schutze et al. | 354/60 L |
| 4,190,344 | 2/1980 | Ishiguro et al. | 354/234 |

*Primary Examiner*—Russell E. Adams
*Attorney, Agent, or Firm*—Fitzpatrick, Cella, Harper & Scinto

[57] ABSTRACT

A shutter control device for a camera having an automatic exposure time control device provided with a comparator circuit for comparing a time output corresponding to the lapse of time from the opening operation of a shutter with a proper shutter speed output representing a proper shutter speed and for generating a comparison output when the two outputs are in a predetermined relation and a magnet for blocking the closing operation of the shutter by energization, the magnet being adapted to be deenergized in response to the comparison output to close the shutter, and a shutter release lock device provided with voltage detecting means for detecting a power source voltage and for deenergizing and magnet before the opening operation of the shutter when the power source voltage is below a reference value and blocking means for blocking the opening operation of the shutter by the deenergization of the magnet before the opening operation of the shutter includes means for forcibly energizing the magnet until the start of the opening operation of the shutter in response to shutter release operation. The means for forcibly energizing the magnet becomes operative in response to the output of the voltage detecting means when the power source voltage is greater than the reference value.

3 Claims, 2 Drawing Figures

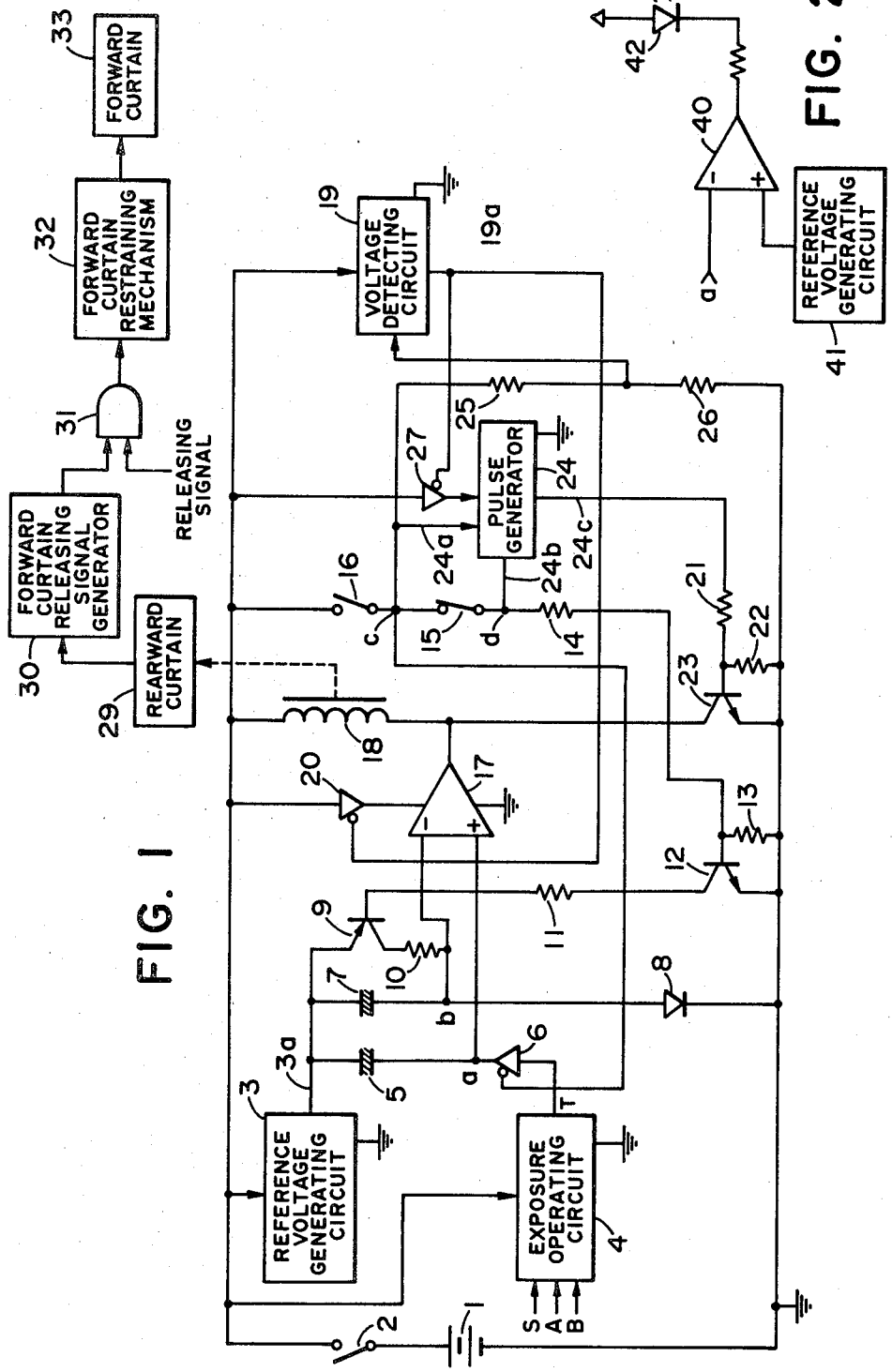

SHUTTER CONTROL DEVICE FOR A CAMERA HAVING A SHUTTER RELEASE LOCK DEVICE

BACKGROUND OF THE INVENTION

1. Field of the Invention

This invention relates to a shutter control device in an automatic exposure camera of the shutter speed control type and which has a device for effecting so-called shutter release lock, i.e., wherein shutter release cannot take place even though shutter release operation is effected during consumption of a battery.

2. Description of the Prior Art

The prior art will hereinafter be described by taking as an example a single lens automatic exposure camera of the shutter speed control type having a focal plane shutter. Such a camera usually includes a rearward shutter curtain restraining electromagnet. In order to prevent unnecessary consumption of the battery, this magnet is not at all times energized, but is energized simultaneously with the mirror-up operation. That is, the rearward curtain, which is mechanically restrained before movement of the forward shutter curtain, becomes electromagnetically restrained by this magnet when the magnet is energized simultaneously with the mirror-up operation effected by depression of a shutter button. When the time from the start of movement of the forward curtain has become equal to the exposure time calculated by an exposure operating circuit, the power supply to the magnet is cut off and the restraint of the rearward curtain is released to permit it to move. In this manner, photography with a proper exposure is completed.

When the battery has been consumed and the battery voltage has dropped to a level unsuitable for effecting exposure control, there is generally known a device for detecting the battery voltage and effecting shutter release lock. The shutter release lock assures that even if a shutter release operation such as depression of the shutter button is effected, the shutter is not operated, that is, shutter release does not take place. The shutter release lock is usually accomplished in a manner to be described hereinafter.

In a predetermined time after the upward movement of the mirror, a forward curtain restraining mechanism is released and the forward shutter curtain starts to move. This forward curtain restraining mechanism is released to permit the forward curtain to start moving after the rearward curtain restraining electromagnet has been energized and the restraint of the rearward curtain has been confirmed. Accordingly, during a predetermined time after mirror-up, the forward curtain restraining mechanism may become releasable by the energization of the rearward curtain restraining electromagnet (namely, the power supply to the magnet coil). Therefore, the device is designed such that when the battery voltage has dropped below a reference value, such drop is detected to prevent the power supply to the rearward curtain restraining electromagnet coil after mirror-up, the magnet will not be energized and accordingly, release of the forward curtain restraining mechanism cannot take place. In this manner, shutter release lock during consumption of the battery is accomplished. Such a technique is disclosed, for example, in U.S. Pat. No. 4,096,503. However, in automatic exposure control, there occur cases where a very short shutter speed above the allowed highest shutter speed (for example, 1/1000 sec.) is required. Such a condition may occur is the object brightness is not extremely high but the set aperture value is sufficiently small. At such time, it may occur that the rearward curtain restraining electromagnet is not energized from the beginning and therefore, the condition in which the forward curtain restraining mechanism can be released cannot be brought about. Accordingly, even in such a condition, there is a possibility that the shutter release lock works. When the shutter release lock takes place as a result, the photographer cannot determine whether it is due to the drop of the battery voltage or to the fact that the shutter time is much shorter than the design program and accordingly, he may sometimes encounter difficulty in judging what measure is to be taken thereafter.

SUMMARY OF THE INVENTION

We have conceived and contribute by the present invention a shutter control device for a camera having a shutter release lock device which ensures that shutter release lock takes place only when the battery voltage has dropped.

In accordance with the present invention, the device includes a malfunction preventing device for forcibly energizing the rearward curtain restraining electromagnet during the period of time before the start of movement of the forward shutter curtain when the battery voltage is above the reference value, whereby shutter release lock takes place only when the battery voltage has dropped below the reference value and, as long as the battery voltage is sufficient, shutter release is effected in whatever photographing condition is desired. Accordingly, the photographer can know the consumption of the battery without error.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit of the invention.

BRIEF DESCRIPTION OF THE DRAWINGS

Specific embodiments of the invention has been chosen for purposes of illustration and description, and are shown in the accompanying drawings, forming a part of the specification wherein:

FIG. 1 is a circuit diagram showing an embodiment of an exposure control circuit including the shutter release lock device of an automatic exposure camera according to the present invention; and FIG. 2 is a circuit diagram showing an example of warning means which may conveniently be added to the circuit of FIG. 1.

DESCRIPTION OF THE PREFERRED EMBODIMENT

FIG. 1 shows a shutter release lock device including the malfunction preventing device according to an embodiment of the present invention and an exposure control circuit, and this refers to a case where the present invention is applied to an automatic exposure single lens reflex camera which effects speed control of a focal plane shutter.

A battery 1 is connected to the shown circuit through a switch 2. A reference voltage generating circuit 3 puts out a predetermined reference voltage at an output terminal 3a. One terminal of each of a memory capacitor 5 and a timer capacitor 7 is connected to the output terminal 3a of the reference voltage generating circuit 3, and the emitter of the short-circuiting PNP transistor 9 of the timer capacitor 7 is also connected to the output terminal 3a. The collector of the transistor 9 is connected to the other terminal of the timer capacitor 7 through a current limiting resistor 10. An exposure operating circuit 4, as is well-known, receives as inputs a film speed value S, an aperture value A and an object brightness B, and puts out a signal T which is a logarithmically compressed signal corresponding to a proper shutter speed. The output signal T of the exposure operating circuit 4 is applied to the other terminal of the memory capacitor 5 through an analog switch 6 which is normally in ON position.

The other terminal of the timer capacitor is connected to the negative pole of the battery 1 through a time compressing diode 8. A comparator 17 is supplied with a voltage through an analog switch 20 which is normally in ON position. One input terminal + of the comparator 17 is connected to the other terminal of the memory capacitor 5 and accordingly, a nodal point a is formed, and the other input terminal - of the comparator 17 is connected to the other terminal of the timer capacitor 7 and accordingly, a nodal point b is formed. The comparator 17 puts out low level when one input terminal + thereof is smaller than the other input terminal −, and otherwise puts out high level. The output terminal of the comparator 17 is connected to the other end of the coil 18 of a rearward curtain restraining magnet having one end thereof connected to the positive pole of the battery 1 through the switch 2.

The base of the short-circuiting transistor 9 is connected to the collector of a transistor 12 through a current limiting resistor 11. The emitter of the transistor 12 is connected to the negative pole of the battery 1. The base of the transistor 12 is connected to a common terminal through a resistor 13 and also connected to one end of a switch 15 through a resistor 14. The switch 15 is normally closed and is opened by movement of a forward curtain, and the other end thereof is connected to one end of a mirror-up switch 16 which is adapted to be closed only when the mirror is moved up, and the other end thereof is connected to the positive pole of the battery 1 through the switch 12. The junction C between the other end of the switch 15 and one end of the mirror-up switch 16 is connected to the control terminal of the aforementioned analog switch 6. What has been described above is an exposure control circuit.

The junction C is connected to the negative pole of the battery 1 through resistors 25 and 26, and the junction between the resistors 25 and 26 is connected to the input terminal of a voltage detecting circuit 19 provided with an output line 19a which assumes a high level when the voltage at the junction between the resistors 25 and 26 is smaller than a predetermined voltage, and otherwise assumes a low level. The output line 19a is connected to the control terminal of the aforementioned analog switch 20. When a first signal is applied as input to the control terminal, the analog switch 20 assumes its OFF position and does not supply a voltage to the comparator 17. The comparator 17 which has thus been rendered inoperative blocks the current flowing in from the other end of the magnet coil 18. That is, no current flows through the coil 18 and the rearward curtain restraining magnet is not energized. When the rearward curtain restraining magnet is energized and the rearward curtain 29 is restrained, a forward curtain releasing signal generator 30 puts out a forward curtain releasing signal. An AND device 31, when the forward curtain releasing signal is applied to one end thereof, transmits to a forward curtain restraining mechanism 32 a release signal applied to the other end of the AND device. Accordingly, when the analog switch 20 is in its OFF position, the magnet is not energized and the release signal is not transmitted to the forward curtain restraining mechanism 32 and the forward curtain 33 does not move and thus, shutter release does not take place. What has been described above is a shutter release lock device.

A pulse generator 24 is supplied with a voltage through an analog switch 27. One input line 24a is connected to the junction C, and the other input line 24b is connected to one terminal of a switch 15 to form a junction d. The pulse generator 24 causes an output line 24c to assume a high level when the mirror-up switch 16 is closed and one input line 24a assumes a high level, and causes the output line 24c to assume a low level when the forward curtain moves and the switch 15 is opened and the other input line 24b assumes a low level. The output line 24c of the pulse generator 24 is connected to the negative pole of the battery 1 through resistors 21 and 22. The junction between the resistors 21 and 22 is connected to the base of an NPN transistor 23. The collector of the transistor 23 is connected to the other end of the coil 18, and the emitter of the transistor 23 is connected to the negative pole of the battery 1. The output line 19a of the voltage detecting circuit 19 is connected to the control terminal of the aforementioned analog switch 27, and the pulse generator 24 operates only when the output line 19a is at low level. What has been described above constitutes a malfunction preventing device.

Operation of the circuit of the embodiment will now be described.

Upon closing of the main switch 2, the voltage of the battery 1 is applied to the circuit, which thus becomes operative.

Description will first be made of a case where the battery voltage is sufficient and above a reference value and exposure conditions are suitable. The film speed value S, the aperture value A and the object brightness information B are applied as the set exposure conditions to the exposure operating circuit 4, the memory capacitor 5 is charged by the reference voltage from the reference voltage generating circuit 3 on the basis of said exposure conditions, and the nodal point a is brought to a potential corresponding to a proper shutter speed T determined by the set exposure conditions.

As soon as a shutter button (not shown) is depressed to photograph an object, and the mirror is moved up in response thereto, the mirror switch 16 is closed. When the potential at the nodal point c assumes a high level upon closing of the mirror switch 16, the analog switch 6 is switched off and the potential at the nodal point a immediately before the upward movement of the mirror is stored in the memory capacitor 5. The timer capacitor 7 starts to be charged through a diode 8 in synchronism with the start of movement of the forward shutter curtain. That is, there is a logarithmically compressed time. The potential at the nodal point a is compared with the potential at the nodal point b by the capacitor 7 to determine the shutter speed. The potentials at the nodal points a and b are applied to the comparator 17 and, in accordance with the magnitudes thereof, power supply or power supply blocking is effected to the coil 18 of the rearward curtain restraining electro-magnet connected as a load to the output of the comparator 17, thereby accomplishing the restraint or the start of movement of the rearward curtain.

Also, upon closing of the mirror switch 16, a potential obtained by dividing the potential at the nodal point c by the resistors 25 and 26 is detected by the voltage detecting circuit 19 and when the battery voltage is above the reference value, the output line 19a assumes low level. Thereby, the analog switches 27 and 20 are switched on, so that the battery voltage is applied to the pulse generator 24 and the comparator 17, which thus become operative.

The pulse generator 24 detects the period of time from the point of time whereat the mirror switch 16 is closed simultaneously with the upward movement of the mirror to the point of time whereat the switch 15 is opened simultaneously with the start of movement of the forward curtain, by the input signals from the nodal points c and d through the input lines 24a and 24b, and generates a high level pulse on the output line 24c during that period of time. This high level pulse is applied to the NPN transistor 23 through the transistors 21 and 22 to turn on the transistor 23, so that power is supplied to the rearward curtain restraining electromagnet coil 18 to energize this magnet. That is, if the battery voltage is above the reference value, the rearward curtain restraining electromagnet is energized upon closing of the mirror switch 16 irrespective of the condition of the comparator 17. By the energization of this magnet, there is brought about a condition in which the forward curtain restraining mechanism 32 can release the restraint of the forward shutter curtain, and the forward curtain is permitted to start moving upon release of the forward curtain restraining mechanism by the shutter release signal occurring thereafter. In this manner, even if the output of the comparator 17 is high level for some reason or other after the closing of the mirror switch 16, the magnet coil 18 is electrically energized through the transistor 23 without fail, thereby enabling movement of the forward curtain.

Upon start of movement of the forward curtain, the switch 15, which has so far been closed, is opened. The NPN transistor 12 biased by the resistors 13 and 14 is turned off by opening of the switch 15, and the NPN transistor 9, having its base connected to the collector of the transistor 12 through the resistor 11, is turned off. After the mirror switch 16 has been closed and before the switch 15 is opened, the transistor 12 is conductive and the transistor 9 is conductive and therefore, the timer compacitor 7 is short-circuited through the current limiting resistor 10 and is hardly charged. As soon as the transistor 9 is turned off, the capacitor starts to be charged and the potential at the nodal point b drops with time. During the time that the potential at the nodal point b is higher than the potential at the nodal point a, the output of the comparator 17 assumes low level and the magnet coil 18 is electrically energized, so that the rearward curtain is restrained from moving by this magnet even after the movement of the forward curtain. When the potential at the nodal point b has become equal to the potential at the nodal point a, the output of the comparator 17 changes to high level and the magnet coil 18 is deenergized, so that the electromagnetic restrained of the rearward curtain is released to permit the rearward curtain to start moving, whereby photography with proper exposure conditions may be effected.

Where the set exposure conditions about an object are unsuitable (for example, the object brightness is too high or the aperture is too wide) and a shutter speed above the highest shutter speed (for example, 1/1000 sec.) has been calculated as a proper shutter speed by the exposure operating circuit 4, it may happen that before the capacitor 7 is charged, the potential at the nodal point b becomes lower than the potential at the nodal point a and the output of the comparator 17 assumes high level and the power supply to the magnet coil 18 is not effected by the comparator 17. Even in such case, as previously described, power is supplied to the magnet coil 18 by the pulse generating circuit 24 during the period of time from the upward movement of the mirror until the start of movement of the forward curtain, and the forward curtain can move and there is no electromagnetic restraint after the movement of the forward curtain and thus, the rearward curtain immediately moves independently of the exposure conditions. Accordingly, shutter release lock does not take place.

Description will now be made of a case in which the battery has been consumed and the battery voltage has dropped below the reference value. Simultaneously with the upward movement of the mirror effected by depression of the shutter button, the mirror switch 16 is closed and the voltage detecting circuit 19 detects the consumption of the battery voltage by a voltage resulting from dividing the potential at the nodal point c, and causes the output line 19a to assume high level. Thereby the analog switches 27 and 20 are switched off and the pulse generator 24 and the comparator 17 become inoperative.

When the pulse generator 24 is inoperative, the output line 24c is at low level and the transistor 23 is turned off, and even after the switch 16 is closed, the magnet coil 18 is not electrically energized. Also, when the comparator 17 is inoperative, the magnet coil 18 is not electrically energized irrespective of the potentials at the nodal points a and b. Accordingly, the rearward curtain restraining magnet is not energized and therefore, the forward curtain restraining mechanism does not become releasable and the forward curtain does not start moving. Since the forward curtain does not move, the rearward curtain cannot move. Thus, when the battery has been consumed, shutter release lock takes place.

Where the photographing conditions are unsuitable, the photographer may be informed of the fact by other warning means, namely, a lamp such as the light-emitting diode S as shown in FIG. 2. That is, a comparator 40 compares the voltage at the nodal point a of FIG. 1 with the output voltage of a reference voltage generating circuit 41. The reference voltage generating circuit 41 puts out a signal for turning on a light-emitting diode 42 when a voltage higher than the voltage corresponding to the controllable highest shutter speed is produced at the nodal point a. The light-emitting diode 42 is provided, for example, in the view-finder.

We believe that the construction and operation of our novel shutter control device will now be understood and that the several advantages thereof will be fully appreciated by those persons skilled in the art.

We claim:

1. A shutter control device for a camera having (a) an automatic exposure time control device provided with a comparator circuit for comparing a time output corresponding to the lapse of time from the opening operation of a shutter with a proper shutter speed output representing a proper shutter speed and for generating a comparison output when said two outputs are in a predetermined relation and a magnet for blocking the closing operation of the shutter by energization, said magnet being adapted to be deenergized in response to said comparison output to close the shutter, and (b) a shutter release lock device provided with voltage detecting means for detecting a power source voltage and for deenergizing said magnet before the opening operation of the shutter when the power source voltage is below a reference value and blocking means for blocking the opening operation of the shutter by the deenergization of said magnet before the opening operation of the shutter, said shutter control device including means for forcibly energizing said magnet until the start of the opening operation of the shutter in response to shutter release operation, said means being operative in response to the output of said voltage detecting means when said power source voltage is greater than said reference value.

2. A shutter control device according to claim 1, wherein said means for forcibly energizing said magnet includes a pulse generating circuit for generating a pulse during the period of time from the shutter release operation until the start of opening operation of said shutter, and a switch adapted to permit a power supply to be fed to said magnet upon generation of a pulse by said pulse generator.

3. A shutter control device according to claim 1 or 2, further including display means for displaying said proper shutter speed output when said proper shutter speed output corresponds to a shutter speed higher than the controllable highest shutter speed.

* * * * *